US011772292B2

(12) United States Patent
Yamada et al.

(10) Patent No.: US 11,772,292 B2
(45) Date of Patent: Oct. 3, 2023

(54) DRAWING DEVICE AND DRAWING METHOD

(71) Applicant: BROTHER KOGYO KABUSHIKI KAISHA, Nagoya (JP)

(72) Inventors: Yoshihiro Yamada, Gifu (JP); Daisuke Abe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 272 days.

(21) Appl. No.: 17/376,877

(22) Filed: Jul. 15, 2021

(65) Prior Publication Data

US 2021/0339560 A1 Nov. 4, 2021

Related U.S. Application Data

(63) Continuation of application No. PCT/JP2019/012757, filed on Mar. 26, 2019.

(30) Foreign Application Priority Data

Jan. 16, 2019 (JP) ................................ 2019-005231

(51) Int. Cl.
*B43L 13/00* (2006.01)
*G06K 9/62* (2022.01)
(Continued)

(52) U.S. Cl.
CPC ............ *B26D 5/005* (2013.01); *B43L 13/00* (2013.01); *G05B 15/02* (2013.01); *G06F 3/13* (2013.01);
(Continued)

(58) Field of Classification Search
CPC .......... B26D 5/005; B26D 5/00; B43L 13/00; B43L 13/022; G05B 15/02; G06F 3/13;
(Continued)

(56) References Cited

U.S. PATENT DOCUMENTS 8,921,473 B1 * 12/2014 Hyman .................... C08K 3/04
524/495
9,302,404 B2 * 4/2016 Matsushima ............ B26D 7/26
(Continued)

FOREIGN PATENT DOCUMENTS

JP  S51-115125 A   10/1976
JP  H4-78597 A      3/1992
(Continued)

OTHER PUBLICATIONS

English translation of International Search Report of International Application No. PCT/JP2019/012757.
(Continued)

*Primary Examiner* — Ramesh B Patel
(74) *Attorney, Agent, or Firm* — K&L Gates LLP

(57) ABSTRACT

A drawing device includes a pen fixed to a cartridge, a mover, a conveyer, a processor, and a memory. The memory stores for each classification of each of a plurality of objects, drawing data representing control conditions of the mover and the conveyer for drawing the object, and angle data representing a fixed angle of the pen with respect to the cartridge when drawing the object. The processor receives at least one of the classifications of the plurality of objects, reads out and acquires, from the memory, the drawing data and the angle data corresponding to the received at least one classification. The processor also displays, on a display, fixed angle information corresponding to the fixed angle represented by the acquired angle data, controls the mover and the conveyer on the basis of the acquired drawing data, and draws the object of the received classification on a target object.

11 Claims, 11 Drawing Sheets

(51) Int. Cl.
*G06F 3/14* (2006.01)
*G06F 3/13* (2006.01)
*G06T 3/60* (2006.01)
*B26D 5/00* (2006.01)
*G05B 15/02* (2006.01)
*G06F 18/24* (2023.01)

(52) U.S. Cl.
CPC ............... *G06F 3/14* (2013.01); *G06F 18/24* (2023.01); *G06T 3/60* (2013.01)

(58) Field of Classification Search
CPC . G06F 3/14; G06F 18/24; G06F 3/147; G06T 3/60; G09G 2340/0492
See application file for complete search history.

(56) References Cited

U.S. PATENT DOCUMENTS

| | | | | |
|---|---|---|---|---|
| 9,910,415 | B2* | 3/2018 | Popovic | H04L 65/403 |
| 10,796,210 | B2* | 10/2020 | Hasegawa | G06K 15/4075 |
| 11,571,924 | B2* | 2/2023 | Mori | B05C 1/00 |
| 2006/0257014 | A1* | 11/2006 | Oi | B26D 7/015 |
| | | | | 382/141 |
| 2010/0217719 | A1* | 8/2010 | Olsen | G06F 21/00 |
| | | | | 705/318 |
| 2013/0180373 | A1* | 7/2013 | Abe | B26D 5/005 |
| | | | | 83/76.1 |
| 2014/0260855 | A1* | 9/2014 | Tokura | B26D 5/007 |
| | | | | 83/76.1 |
| 2015/0039133 | A1* | 2/2015 | Popovic | G05B 15/02 |
| | | | | 700/275 |
| 2016/0094744 | A1* | 3/2016 | Yamamoto | H04N 1/387 |
| | | | | 358/3.31 |
| 2018/0141371 | A1* | 5/2018 | Domen | B43L 13/024 |
| 2018/0173186 | A1* | 6/2018 | Yamamoto | G05B 19/4097 |
| 2019/0168533 | A1* | 6/2019 | Abe | B43L 13/007 |
| 2019/0193420 | A1* | 6/2019 | Hasegawa | B43L 13/024 |
| 2021/0339559 | A1* | 11/2021 | Mori | B05C 1/00 |

FOREIGN PATENT DOCUMENTS

| | | |
|---|---|---|
| JP | H5-2996 U | 1/1993 |
| JP | H6-25903 A | 4/1994 |
| JP | H6-25903 U | 4/1994 |
| JP | 2017-24118 A | 2/2017 |
| WO | 2017/013944 A1 | 1/2017 |
| WO | 2018/029958 A1 | 2/2018 |
| WO | 2018/029960 A1 | 2/2018 |
| WO | 2018/029961 A1 | 2/2018 |

OTHER PUBLICATIONS

International Preliminary Report on Patentability Chapter 1 dated Jun. 16, 2021, issued for International PCT Application No. PCT/JP2019/012757.

* cited by examiner

FIG. 4

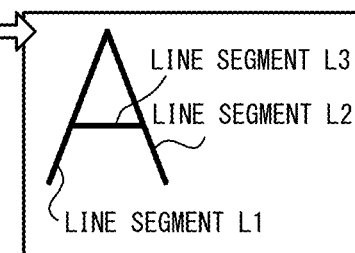

| CLASSIFICATION | CHARACTER/PATTERN CLASSIFICATION | | CHARACTER | 74A (740) |
| --- | --- | --- | --- | --- |
| | FONT CLASSIFICATION | | ITALIC | |
| | CHARACTER CLASSIFICATION | | A | |
| NO. OF LINE SEGMENTS | | | 3 | |
| LINE SEGMENT L1 | ANGLE DATA | FIXED ANGLE | 45 | |
| | | MARK | 3 | |
| | DRAWING DATA | START COORDINATES X | 0 | |
| | | START COORDINATES Y | 0 | |
| | | END COORDINATES X | 10 | |
| | | END COORDINATES Y | 20 | |
| LINE SEGMENT L2 | ANGLE DATA | FIXED ANGLE | 45 | |
| | | MARK | 3 | |
| | DRAWING DATA | START COORDINATES X | 10 | |
| | | START COORDINATES Y | 20 | |
| | | END COORDINATES X | 20 | |
| | | END COORDINATES Y | 0 | |
| LINE SEGMENT L3 | ANGLE DATA | FIXED ANGLE | 45 | |
| | | MARK | 3 | |
| | DRAWING DATA | START COORDINATES X | 3 | |
| | | START COORDINATES Y | 5 | |
| | | END COORDINATES X | 7 | |
| | | END COORDINATES Y | 5 | |

FIG. 5

| CLASSIFICATION | CHARACTER/PATTERN CLASSIFICATION | | CHARACTER |
|---|---|---|---|
| | FONT CLASSIFICATION | | GOTHIC |
| | CHARACTER CLASSIFICATION | | D |
| NO. OF LINE SEGMENTS | | | 11 |
| LINE SEGMENT L1 | ANGLE DATA | FIXED ANGLE | 90 |
| | | MARK | 7 |
| | DRAWING DATA | START COORDINATES X | 0 |
| | | START COORDINATES Y | 20 |
| | | END COORDINATES X | 0 |
| | | END COORDINATES Y | 0 |
| LINE SEGMENT L2 | ANGLE DATA | FIXED ANGLE | 45 |
| | | MARK | 3 |
| | DRAWING DATA | START COORDINATES X | 0 |
| | | START COORDINATES Y | 20 |
| | | END COORDINATES X | 4 |
| | | END COORDINATES Y | 18 |
| LINE SEGMENT L3 | ANGLE DATA | FIXED ANGLE | 45 |
| | | MARK | 3 |
| | DRAWING DATA | START COORDINATES X | 4 |
| | | START COORDINATES Y | 18 |
| | | END COORDINATES X | 8 |
| | | END COORDINATES Y | 16 |
| LINE SEGMENT L4 | ANGLE DATA | FIXED ANGLE | 45 |
| | | MARK | 3 |
| | DRAWING DATA | START COORDINATES X | 8 |
| | | START COORDINATES Y | 16 |
| | | END COORDINATES X | 12 |
| | | END COORDINATES Y | 14 |
| LINE SEGMENT L5 | ANGLE DATA | FIXED ANGLE | 45 |
| | | MARK | 3 |
| | DRAWING DATA | START COORDINATES X | 12 |
| | | START COORDINATES Y | 14 |
| | | END COORDINATES X | 16 |
| | | END COORDINATES Y | 12 |
| ⋮ | ⋮ | ⋮ | ⋮ |
| LINE SEGMENT L11 | ANGLE DATA | FIXED ANGLE | 45 |
| | | MARK | 3 |
| | DRAWING DATA | START COORDINATES X | 4 |
| | | START COORDINATES Y | 2 |
| | | END COORDINATES X | 0 |
| | | END COORDINATES Y | 0 |

74B(740)

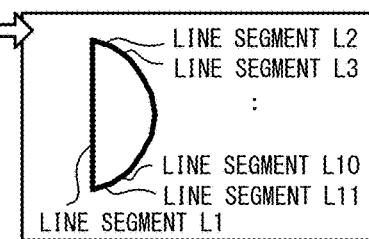

FIG. 6

| CLASSIFICATION | CHARACTER/PATTERN CLASSIFICATION | | PATTERN | |
|---|---|---|---|---|
| | FONT CLASSIFICATION | | – | |
| | CHARACTER CLASSIFICATION | | – | |
| NO. OF LINE SEGMENTS | | | 3 | |
| LINE SEGMENT L1 | ANGLE DATA | FIXED ANGLE | 45 | |
| | | MARK | 3 | |
| | DRAWING DATA | START COORDINATES | X | 0 |
| | | | Y | 0 |
| | | END COORDINATES | X | 10 |
| | | | Y | 20 |
| LINE SEGMENT L2 | ANGLE DATA | FIXED ANGLE | 45 | |
| | | MARK | 3 | |
| | DRAWING DATA | START COORDINATES | X | 10 |
| | | | Y | 20 |
| | | END COORDINATES | X | 20 |
| | | | Y | 0 |
| LINE SEGMENT L3 | ANGLE DATA | FIXED ANGLE | 45 | |
| | | MARK | 3 | |
| | DRAWING DATA | START COORDINATES | X | 20 |
| | | | Y | 0 |
| | | END COORDINATES | X | 30 |
| | | | Y | 20 |

74C(740)

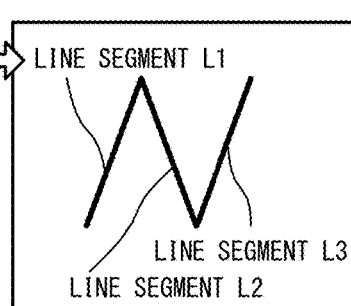

DRAWING DEVICE AND DRAWING METHOD

CROSS-REFERENCE TO RELATED APPLICATION

This application is a Continuation Application of International Application No. PCT/JP2019/012757, filed Mar. 26, 2019, which claims priority from Japanese Patent Application No. 2019-005231, filed on Jan. 16, 2019. Both of the applications are incorporated herein by reference in their entireties.

BACKGROUND

The present disclosure relates to a drawing device and a drawing method for drawing a calligraphy font on a target object using a pen fixed to a cartridge.

A cutting device for cutting a sheet-like target object is known. A cutter cartridge to which a cutter is fixed is fitted to the cutting device. The cutting device cuts the target object by moving the cutter cartridge with respect to the target object. Also, the cutting device may also be able to be fitted with a pen cartridge to which a pen is fixed, instead of the cutter cartridge. In this case, the cutting device is able to draw a character or a pattern on the target object with the pen by moving the pen cartridge with respect to the target object.

SUMMARY

In a state in which the pen cartridge is mounted in the cutting device, there is a demand to draw a character, a pattern, or the like (hereinafter referred to as an "object") in calligraphy. Here, in the calligraphy, there is a case in which an angle of the pen is specified for each of a classification of the object, when a direction of an axis of the pen during the drawing is a rotational axis. In other words, when the drawing by calligraphy is realized using the cutting device, it is necessary to adjust the angle of the pen for each classification of the object. However, in the known cutting device, the drawing of the object in calligraphy is not assumed. As a result, the cutting device cannot perform the drawing while taking into account the angle of the pen, and thus, there is a problem that the object cannot be appropriately drawn in calligraphy.

The object of the present disclosure is to provide a drawing device and a drawing method capable of appropriately drawing an object on a target object in calligraphy.

Various embodiments herein provide a drawing device for drawing on a target object using a pen fixed to a cartridge. The drawing device includes a mover, a conveyer, a processor, and a memory. The mover is configured to move the cartridge in a first direction. The conveyer configured to convey the target object in a second direction orthogonal to the first direction. The processor is configured to control the mover and the conveyer to cause the cartridge and the target object to move relative to each other, and is to draw an object on the target object using the pen. The memory is configured to store drawing data and angle data for each classification of each of a plurality of the objects. The drawing data represent control conditions of the mover and the conveyer for drawing the object, and the angle data represent a fixed angle of the pen with respect to the cartridge when drawing the object. The fixed angle is an angle in a rotation direction with a direction in which an axis line of the pen fixed to the cartridge extends as a rotation axis. The memory is also configured to store computer-readable instructions. When executed by the processor, the computer-readable instructions instruct the processor to perform processes. The processes include receiving at least one of the classifications of the plurality of objects. The processes further include reading out and acquiring, from the memory, the drawing data and the angle data corresponding to the received at least one classification. The processes further include displaying, on a display, fixed angle information corresponding to the fixed angle represented by the acquired angle data. The processes further include controlling the mover and the conveyer on the basis of the acquired drawing data, and drawing the object of the received classification on the target object.

Various embodiments also provide a drawing method for drawing an object on a target object, using a drawing device including a mover, a conveyer, a memory, and a processor. The mover moves a cartridge, to which a pen is fixed, in a first direction. The conveyer conveys the target object in a second direction orthogonal to the first direction. The processor controls the mover and the conveyer to cause the cartridge and the target object to move relative to each other, and to draw the object on the target object using the pen fixed to the cartridge. The method includes receiving at least one classification of a plurality of the objects. The method further includes reading out and acquiring drawing data and angle data corresponding to the received at least one classification, from a memory configured to store, for each of the classifications of each of the plurality of objects. The drawing data represent control conditions of the mover and the conveyer for drawing the object, and the angle data represent a fixed angle of the pen with respect to the cartridge when drawing the object. The fixed angle is an angle in a rotation direction with a direction in which an axis line of the pen fixed to the cartridge extends as a rotation axis. The method further includes displaying, on a display, fixed angle information corresponding to the fixed angle represented by the acquired angle data. The method further includes controlling the mover and the conveyer on the basis of the acquired drawing data, and drawing the object of the received classification on the target object.

BRIEF DESCRIPTION OF THE DRAWINGS

Embodiments of the disclosure will be described below in detail with reference to the accompanying drawings in which:

FIG. 4 is a diagram showing a data table 74A;

FIG. 5 is a diagram showing a data table 74B;

FIG. 6 is a diagram showing a data table 74C;

DETAILED DESCRIPTION OF EMBODIMENTS

Embodiments embodying the present disclosure will be described in order with reference to the drawings. The drawings to be referenced are used to illustrate the technical features that can be adopted in the present disclosure, and the described structures and the like of the devices are not intended to be limited thereto, but are merely explanatory examples.

Overview of Cutting Device 1A

Figure 1:
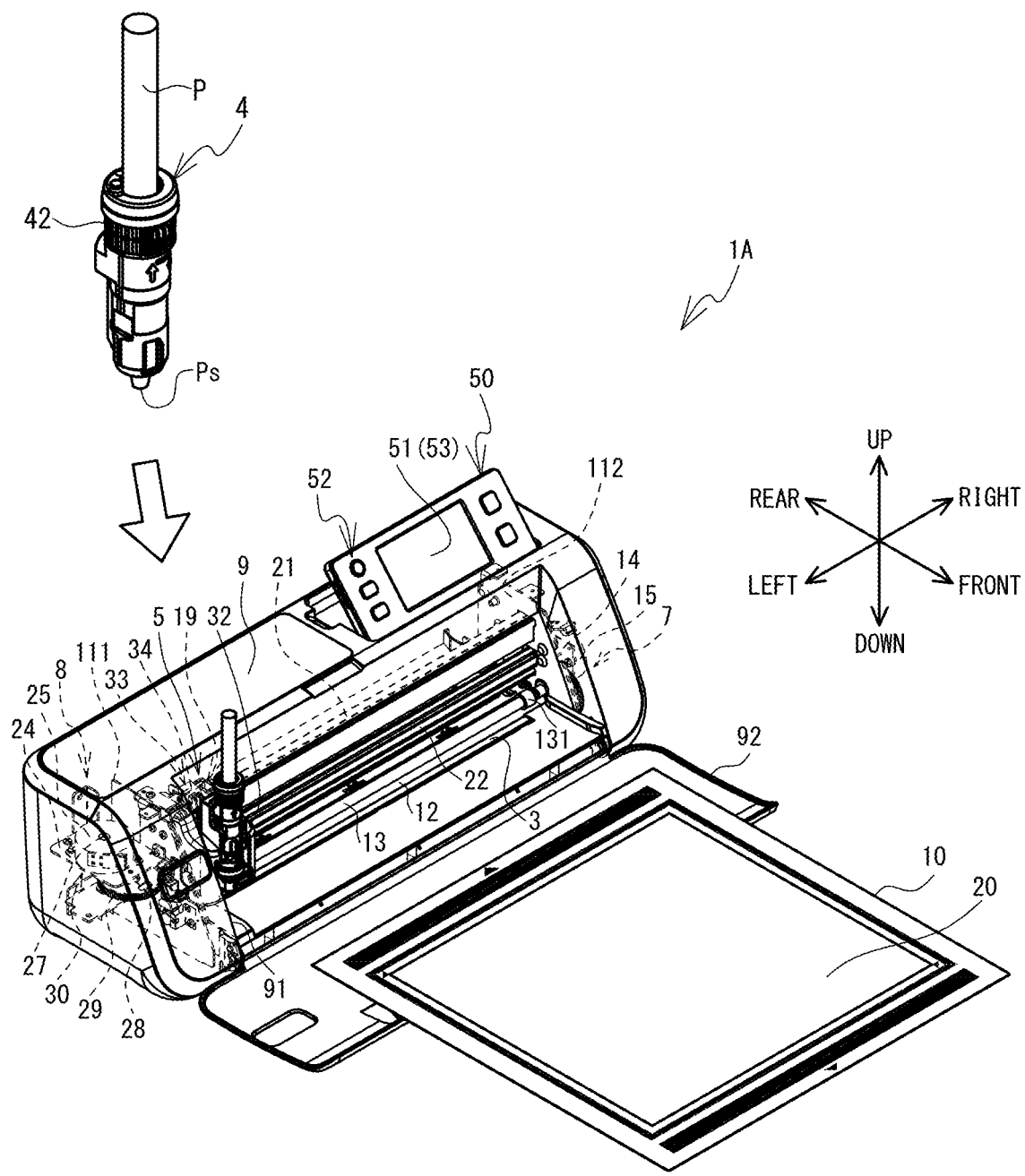
FIG. 1 is a perspective view of a cutting device 1A.

An overview of a cutting device 1A will be described with reference to FIG. 1. The cutting device 1A is used in a state fitted with a cartridge 4 capable of fixing a cutting blade (not shown in the drawings) or a pen P. When the cutting device 1A is fitted with the cartridge 4 to which a cutting blade has been fixed, the cutting device 1A can cut a sheet-like target object 20 using the cutting blade. Also, when the cutting device 1A is fitted with the cartridge 4 to which the pen P has been fixed, the cutting device 1A can draw a character or a pattern (hereinafter collectively referred to as "object") on the target object 20 using the pen P. In the description below, a case is assumed in which the cartridge 4 to which the pen P is fixed is fitted to the cutting device 1A. The lower left side, the upper right side, the lower right side, the upper left side, the upper side, and the lower side in FIG. 1 are the left side, the right side, the front side, the rear side, the upper side, and the lower side, respectively, of the cutting device 1A and the cartridge 4.

Figure 2:
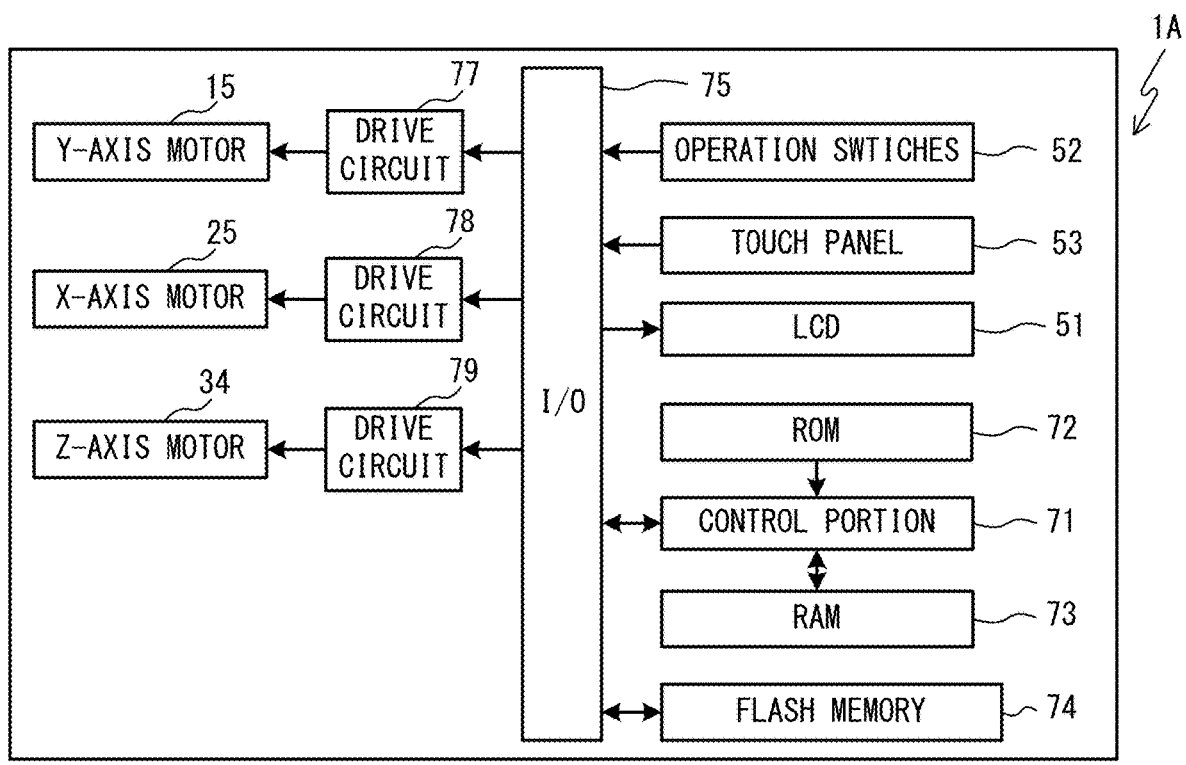
FIG. 2 is a block diagram showing an electrical configuration of the cutting device 1A.

The cutting device 1A is provided with a main body cover 9, a platen 3, a head 5, a conveyer 7, a mover 8, a holder 10, and a controller 71 (refer to FIG. 2). The holder 10 is conveyed in the front-rear direction by the cutting device 1A. The holder 10 is a rectangular mat having a predetermined thickness. The target object 20 is held on the upper surface of the holder 10. The main body cover 9 is a case having a substantially rectangular box shape that is long in the right-left direction. The main body cover 9 is provided with an opening 91, a cover 92, and an operating portion 50. The opening 91 is an opening provided in a front surface portion of the main body cover 9. The cover 92 is a plate-shaped member that is long in the left-right direction. A lower end side of the cover 92 is supported by the main body cover 9 so as to be able to rotate. In FIG. 1, the cover 92 is open such that the opening 91 is open.

The operating portion 50 is provided with a liquid crystal display (LCD) 51, a plurality of operating switches 52, and a touch panel 53. An image including various items, such as commands, illustrations, setting values, and messages is displayed on the LCD 51. The touch panel 53 is provided on the surface of the LCD 51. A user performs a pressing operation (hereinafter, this operation is referred to as a "panel operation") on the touch panel 53, using either a finger or a stylus pen. In the cutting device 1A, which of the items has been selected is recognized in accordance with a pressed position detected by the touch panel 53. The user can use the operating switches 52 and the touch panel 53 to select a pattern displayed on the LCD 51, set various parameters, perform an input operation, and the like.

The platen 3 is provided inside the main body cover 9. The platen 3 receives the lower surface of the holder 10, and the holder 10 for holding the target object 20 can be placed on the platen 3. The holder 10 is set on the platen 3 while the opening 91 is open.

The head 5 is provided with a carriage 19, a mounting portion 32, and an up-down drive mechanism 33. The mounting portion 32 is able to be fitted with the cartridge 4. The cartridge 4 is fixed to the mounting portion 32 in a state in which a pen tip (hereinafter referred to as a "writing portion Ps") of the pen P is arranged at the lower end. The up-down drive mechanism 33 moves the mounting portion 32 in a direction in which the mounting portion 32 moves toward the platen 3 (i.e. downward), and a direction in which the mounting portion 32 moves away from the platen 3 (i.e. upward). Therefore, the up-down drive mechanism 33 moves the cartridge 4 mounted to the mounting portion 32 in the up-down direction. The up-down drive mechanism 33 of a present example converts a rotational movement of a Z-axis motor 34 into an up-down movement, transmits the up-down movement to the mounting portion 32, and drives the cartridge 4 and the mounting portion 32 in the up-down direction (also referred to as a Z direction).

The conveyer 7 conveys the target object 20 held by the holder 10 in a sub-scanning direction orthogonal to a main scanning direction by conveying the holder 10 in the sub-scanning direction. The main scanning direction and the sub-scanning direction in this example are the left-right direction and the front-rear direction, respectively. The conveyer 7 is configured to be able to convey the holder 10 set on the platen 3 in the front-rear direction (also referred to as a Y direction) of the cutting device 1A. The conveyer 7 conveys the target object 20 held by the holder 10 in the sub-scanning direction. The conveyer 7 is provided with a driving roller 12, a pinch roller 13, an attachment frame 14, and a Y-axis motor 15. A pair of side wall portions 111 and 112 are provided facing each other, inside the main body cover 9. The side wall portion 111 is positioned to the left of the platen 3. The side wall portion 112 is positioned to the right of the platen 3. The driving roller 12 and the pinch roller 13 are rotatably supported between the side wall portions 111 and 112. The driving roller 12 and the pinch roller 13 extend in the left-right direction (also referred to as an X direction) of the cutting device 1A, and are aligned in the up-down direction. A roller portion (not shown in the drawings) is provided on the left end of the pinch roller 13, and a roller portion 131 is provided on the right end of the pinch roller 13.

The attachment frame 14 is fixed to the outer surface side (the right side) of the side wall portion 112. The Y-axis motor 15 is attached to the attachment frame 14. A driving gear meshes with a driven gear (not shown in the drawings). The driven gear is anchored to a leading end of a right end portion of the driving roller 12.

When the holder 10 is conveyed, the outer left portion of the holder 10 is sandwiched between the driving roller 12 and the left roller portion (not shown in the drawings) of the pinch roller 13. The outer right portion of the holder 10 is sandwiched between the driving roller 12 and the roller portion 131. When the Y-axis motor 15 is driven forward or in reverse, the rotational movement of the Y-axis motor 15 is transmitted to the driving roller 12. As a result, the holder 10 is conveyed forward or rearward.

The mover 8 is configured to be able to move the head 5 in a direction orthogonal to the conveyance direction of the holder 10, i.e., in the X direction. That is, the movement direction of the head 5 is orthogonal to the conveyance direction of the holder 10. The mover 8 is provided with a pair of upper and lower guide rails 21 and 22, an attachment frame 24, an X-axis motor 25, a driving gear 27 and a driven gear 29, a transmission mechanism 30, and the like. The guide rails 21 and 22 are fixed between the side wall portions 111 and 112. The guide rails 21 and 22 are positioned to the rear of, and above, the pinch roller 13. The guide rails 21 and 22 extend substantially parallel to the pinch roller 13, i.e., in the X direction. The carriage 19 of the head 5 is supported by the guide rails 21 and 22 so as to be able to move in the X direction along the guide rails 21 and 22.

The attachment frame 24 is fixed to the outer surface side (the left side) of the side wall portion 111. The X-axis motor 25 is attached so as to be oriented downward, to the rear of the attachment frame 24. The driving gear 27 is fixed to an output shaft of the X-axis motor 25. The driven gear 29 meshes with the driving gear 27. Although not shown in the drawings, the transmission mechanism 30 includes a left and right pair of timing pulleys, and an endless timing belt that is stretched over the left and right pair of timing pulleys. A timing pulley 28 that is one of the timing pulleys is provided on the attachment frame 24, such that the timing pulley 28 can rotate integrally with the driven gear 29. The other timing pulley is provided on the attachment frame 14. The timing belts extend in the X direction and are coupled to the carriage 19.

The mover 8 moves the cartridge 4 mounted to the mounting portion 32 of the head 5 in the main scanning direction. The mover 8 converts the rotational movement of the X-axis motor 25 into motion in the X direction, and transmits this motion to the carriage 19. When the X-axis motor 25 is driven forward or in reverse, the rotational movement of the X-axis motor 25 is transmitted to the timing belt via the driving gear 27, the driven gear 29, and the timing pulley 28. In this way, the carriage 19 is moved to the left or to the right.

Electrical Configuration of Cutting Device 1A

An electrical configuration of the cutting device 1A will be explained with reference to FIG. 2. The cutting device 1A is provided with the controller 71, a ROM 72, a RAM 73, and an input/output (I/O) interface 75. The controller 71 is electrically connected to the ROM 72, the RAM 73, and the I/O interface 75. The controller 71 is a CPU that performs overall control of the cutting device 1A, along with the ROM 72 and the RAM 73. The ROM 72 stores various programs used to operate the cutting device 1A. The RAM 73 temporarily stores arithmetic calculation results and the like calculated by the controller 71.

Further, a flash memory 74, the operating switches 52, the touch panel 53, the LCD 51, and drive circuits 77 to 79 are connected to the I/O interface 75. The flash memory 74 is a non-volatile storage element that stores various parameters, a data table 740 (refer to FIG. 4 to FIG. 6), and the like. The LCD 51 can perform notification of various commands. The drive circuits 77 to 79 respectively drive the Y-axis motor 15, the X-axis motor 25, and the Z-axis motor 34. The controller 71 drives the Y-axis motor 15, the X-axis motor 25, and the Z-axis motor 34 via the drive circuits 77 to 79, and thus controls the conveyer 7 and the mover 8. In this way, the controller 71 causes the cartridge 4 mounted on the mounting portion 32 to move relative to the target object 20 held by the holder 10. As a result, the object is drawn on the target object 20 by the pen P fixed to the cartridge 4.

Drawing of Object in Calligraphy

When the object is to be drawn in calligraphy, the pen P including the writing portion Ps with an elliptical or rectangular cross-sectional shape, a so-called calligraphy pen, may be used. Also, with calligraphy that is realized using such a pen P, the angle of the pen P with respect to the target object 20 when drawing may be specified for each of a classification of the object. Here, the angle of the pen P is an angle of a rotational direction, when a direction in which the axis of the pen P extends is a rotational axis.

Figure 3:
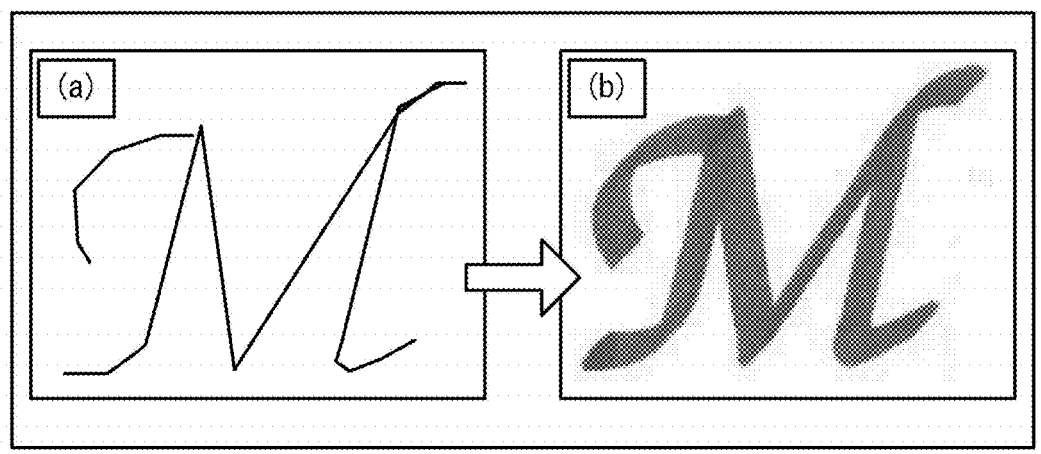
FIG. 3 is diagram showing a character "M" drawn in italic font in calligraphy.

For example, FIG. 3 shows a state of drawing a character "M" in italic font, which is one of fonts, in calligraphy. In this way, the character "M" is defined by a plurality of line segments (refer to FIG. 3(*a*)), and the angle when drawing each of the line segments using the pen P is specified. By using the pen P including the writing portion Ps that has the rectangular cross-section, and by drawing the line segments in a state in which the pen P is held at the specified angle, the character "M" is drawn in a format shown in FIG. 3(*b*).

Therefore, when drawing the object in calligraphy using the cutting device 1A, the angle at which the pen P is fixed to the cartridge 4 (hereinafter referred to as a "fixed angle") is important. The fixed angle corresponds to the angle in the rotational direction for which the direction in which the axis of the pen P fixed to the cartridge 4 extends is the rotational axis. When attempting to draw the aesthetically pleasing object in calligraphy using the cutting device 1A, the user must appropriately fix the pen P to the cartridge 4 at the fixed angle specified for each classification of the object, and attach this cartridge 4 to the cutting device 1A, and then use the cutting device 1A. In the present embodiment, the fixed angle of the pen P with respect to the cartridge 4 is adjusted using the positioning jig 1B.

Data Table 74A

An example of the data table 740 (data tables 74A (refer to FIG. 4), 74B (refer to FIG. 5), and 74C (refer to FIG. 6)) stored in the flash memory 74 (refer to FIG. 2) of the cutting device 1A will be explained with reference to FIG. 4 to FIG. 6. The data table 740 is referred to when the controller 71 controls the conveyer 7 and the movement 8 and draws the object on the target object 20 using the pen P. The data table 740 includes the classification (a character/pattern classification, a font classification, a character classification), a number of line segments, angle data, and drawing data.

The character/pattern classification indicates whether the object to be drawn is a character or a pattern. For example, the character/pattern classification in the data tables 74A (refer to FIG. 4) and 74B (refer to FIG. 5) is "character," and the character/pattern classification in the data table 74C (refer to FIG. 6) is "pattern." When the object classification is the character, the font classification indicates the font of the character. When the object classification is the character, the character classification indicates the classification of each of characters, such as hiragana, katakana, numerals, alphabet, and the like. Hereinafter, the character/pattern classification, the font classification, and the character classification are sometimes collectively denoted by "(character/pattern classification)/(font classification)/(character classification)."

The number of line segments indicates the number of line segments included in the object of the corresponding classification. For example, in the data table 74A, the character "A" includes three line segments (line segments L1 to L3). In the data table 74B, the character "D" includes eleven line segments (line segments L1 to L11). In the data table 74C, a pattern (substantially N-shaped) includes the three line segments (the line segments L1 to L3).

The angle data and the drawing data are set for each of the line segments included in the object of the corresponding classification. The angle data includes the fixed angle and a marking.

The fixed angle indicates an angle (unit: °) when the pen P is fixed to the cartridge 4 when drawing the corresponding line segment. The fixed angle is a value that is an integral multiple of 15. This is because, in the positioning jig 1B (refer to FIG. 7 and FIG. 8), the fixed angle of the pen P that can be determined is an integral multiple of 15. The marking indicates a marking that is referred to when fixing the pen P to the cartridge 4 at the corresponding fixed angle, using the positioning jig 1B (refer to FIG. 7 and FIG. 8). The marking is a value obtained by adding 1 to a value obtained by dividing the corresponding fixed angle by 15. Thus, relationships between the fixed angle and the marking, when expressed as "fixed angle/marking", are, respectively, 0°/1, 15°/2, 30°/3, 45°/4, 60°/5, 75°/6, 90°/7, 105°/8, 120°/9, 135°/10, 150°/11, and 165°/12. In this way, in the data table

740, for each of the object classifications (character/pattern classification)/(font classification)/(character classification), the fixed angle of the line segment configuring the object is identified and stored.

The drawing data includes coordinate data (start coordinate data) of a point at which the drawing of the corresponding line segment starts, and coordinate data (end coordinate data) of a point at which the drawing of the corresponding line segment ends. An origin point of a coordinate system of the coordinate data is a point to the rear left of a region in which the drawing is possible. The controller 71 identifies a point identified by the coordinate data using the origin point as a reference, and performs the control of the conveyer 7 and the mover 8 (to be explained in more detail later). The drawing data corresponds to control conditions when controlling the conveyer 7 and the mover 8 in order to draw the corresponding line segment.

As shown in FIG. 4, in the data table 74A, for example, the number "3" is associated with the classification "character/italic/A," as the number of line segments corresponding thereto, and, as the angle data of each of the three line segments, the common fixed angle "45°" is associated therewith. In other words, the fixed angle of all the line segments configuring the object of the classification "character/italic/A" is the same. Further, as shown in FIG. 6, in the data table 74C, for example, the number "3" is associated with the classification "pattern/(none)/(none)," as the number of line segments corresponding thereto, and, as the angle data of each of the three line segments, the common fixed angle "45(°)" is associated therewith. In other words, the fixed angle of all of the line segments configuring the object of the classification "pattern/(none)/(none)" is the same.

On the other hand, as shown in FIG. 5, in the data table 74B, for example, the number "11" is associated with the classification "character/gothic/D" as the number of line segments corresponding thereto, and the fixed angle "90(°)" is associated therewith as the angle data corresponding to the line segment L1, and the fixed angle "45(°)" is associated therewith as the angle data corresponding to the line segments L2 to L11. In other words, in contrast to the classification "character/italic/A" (refer to FIG. 4), and the classification "pattern/(none)/(none)" (refer to FIG. 6), the fixed angles of the plurality of line segments configuring the object of the classification "character/gothic/D" are not all the same, and some are different.

Overview of Operations of Cutting Device 1A

An overview of operations will be explained, by which the cutting device 1A draws the object on the target object 20 in accordance with the data table 740. In a state in which the writing portion Ps of the pen P is separated upward from the target object 20, the cutting device 1A controls the conveyer 7 and the mover 8, and moves to a start position indicated by the start coordinate data of each of the line segments of the data table 740. The cutting device 1A drives the Z-axis motor, and moves the pen P to a drawing position at which the writing portion Ps of the pen P is in contact with the target object 20. In this state, the cutting device 1A controls the conveyer 7 and the mover 8, and moves the target object 20 and the pen P relative to each other in the X direction and the Y direction until an end position indicated by the end coordinate data of the data table 740 is reached. In this way, the object is drawn on the target object 20.

Note that, as described with reference to FIG. 4 to FIG. 6, the fixed angle of the pen P when drawing the line segment configuring the object is specified for each classification of the object. Thus, before the drawing of the object by the cutting device 1A is started, it is necessary for the user to fix the pen P to the cartridge 4 at the fixed angle specified by the data table 740, and to mount the cartridge 4 on the mounting portion 32 of the cutting device 1A. Further, when drawing a plurality of the objects, or when the line segments having the different fixed angles are continuously drawn by the cutting device 1A, it is necessary to switch the fixed angle of the pen P with respect to the cartridge 4 during the drawing of the series of objects. Here, the cutting device 1A displays, on the LCD 51, information necessary for positioning the pen P on the cartridge 4 using the positioning jig 1B, at a timing at which it is necessary to switch the fixed angle, thus notifying the user.

Positioning Jig 1B

Figure 7:
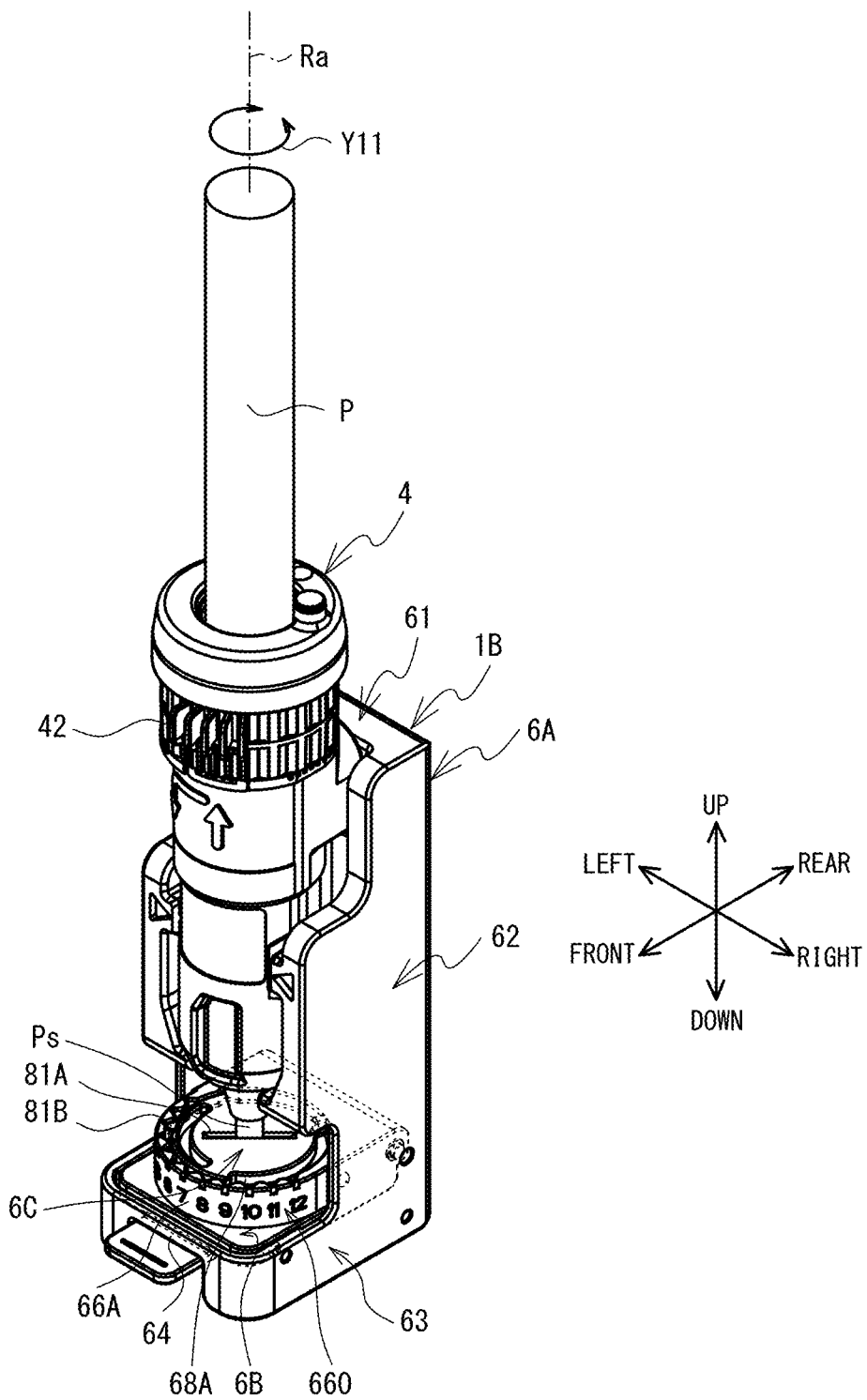
FIG. 7 is a perspective view showing a positioning jig 1B, a cartridge 4, and a pen P.

The positioning jig 1B will now be explained with reference to FIG. 7 and FIG. 8. The positioning jig 1B is a jig that is used to position the pen P in the rotational direction with respect to the cartridge 4, and fix the pen P to the cartridge 4 at a desired fixed angle. In the description below, the lower left side, the upper right side, the lower right side, the upper left side, the upper side, and the lower side in FIG. 7 are the front side, the rear side, the right side, the left side, the upper side, and the lower side, respectively, of the positioning jig 1B. The positioning jig 1B includes a holder 6A, a base portion 6B, and a contact portion 6C.

The holder 6A is configured by plate-shaped frames 61 to 64 and holds the cartridge 4. As shown in FIG. 8, a virtual straight line extending in the up-down direction in the holder 6A defines a "rotational axis Ra." As shown in FIG. 7, in a state in which the cartridge 4 is held, the rotational axis Ra corresponds to a virtual straight line extending along the axis of the pen P housed in the cartridge 4. A rotational direction centered on the rotational axis Ra is defined as a "rotational direction Y11."

The base portion 6B is supported on a lower end portion of the holder 6A, and rotatably supports the contact portion 6C. A scale portion 660, which is aligned along the rotational direction Y11 centered on the rotational axis Ra, is formed in a curved portion 66A provided on a front side surface of the base portion 6B. The scale portion 660 has markings corresponding to respective numbers "1 to 12" (denoted by marking [1], marking [2], . . . marking [12]). Each of the markings [1] to [12] of the scale portion 660 indicate the angle in the rotational direction Y11 centered on the rotational axis Ra.

Figure 8:
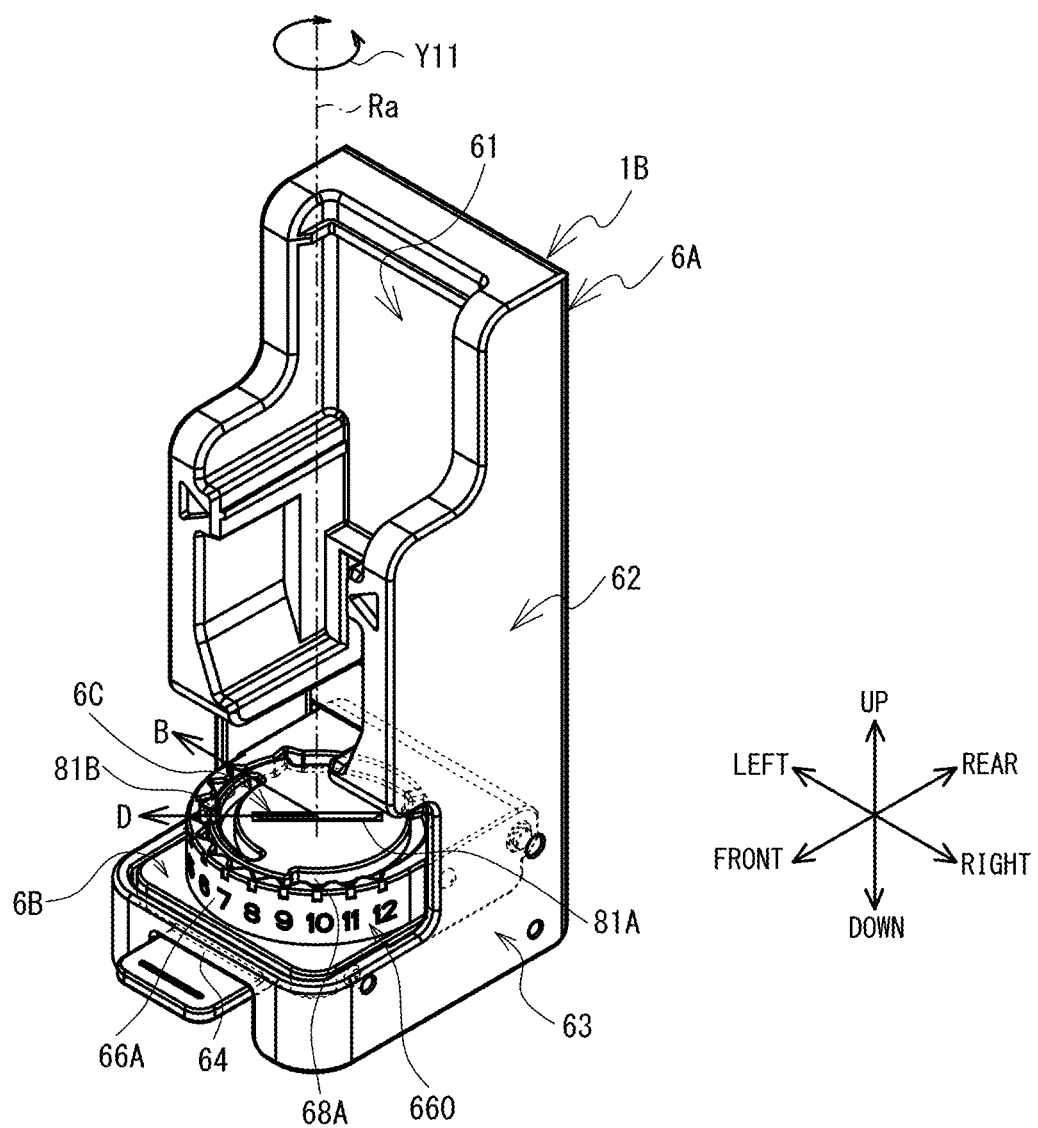
FIG. 8 is a perspective view of the positioning jig 1B.

As shown in FIG. 8, a plurality of recesses 68A are provided in an inner wall surface of indented portions provided in the upper surface of the base portion 6B. The plurality of recesses 68A correspond one-to-one with the markings [1] to [12] of the scale portion 660 formed on the curved portion 66A. When viewed from above, a virtual reference direction B extending in a straight line to the left from the rotational axis Ra is defined. In this case, the recess 68A corresponding to the marking [1] of the scale portion 660 is arranged in the reference direction B with respect to the rotational axis Ra. Further, when viewed from above, each of the recesses 68A corresponding to a marking [N] (N=1, 2, . . . 12) of the scale portion 660 is arranged in a direction in which the reference direction B centered on the rotational axis Ra has been rotated in the counterclockwise direction by N×15−15(°) at a time.

The contact portion 6C is rotatably supported on the base portion 6B, centered on the rotational axis Ra. The contact portion 6C has a substantially circular shape. A recess 81A that extends in a straight line in the horizontal direction and passes through the rotational axis Ra is provided in the upper surface of the contact portion 6C. As shown in FIG. 7, in the state in which the cartridge 4 accommodating the pen P is held by the holder 6A, the writing portion Ps is inserted into the recess 81A. As shown in FIG. 8, of a peripheral end portion of the contact portion 6C, a protrusion 81B is provided in a position overlapping a virtual straight line D extending horizontally along the recess 81A. The protrusion 81B protrudes toward the outside in a radial direction centered on the rotational axis Ra. The protrusion 81B engages with one of the plurality of recesses 68A of the base portion 6B.

When an operation is performed to rotate the contact portion 6C in the rotational direction Y11, the protrusion 81B of the contact portion 6C repeatedly engages with and separates from each of the plurality of recesses 68A of the base portion 6B. The contact portion 6C is rotated in increments of 15° in the rotational direction Y11, while sequentially causing the protrusion 81B to be engaged with the recesses 68A corresponding to each of marking [1], marking [2], marking [3] and so on of the scale portion 660 of the base portion 6B.

When performing the position of the pen P with respect to the cartridge 4 using the positioning jig 1B, first, the fixed angle and the marking of the pen P depending on the classification of the object to be drawn on the target object 20 in calligraphy are displayed on the LCD 51 of the cutting device 1A (refer to FIGS. 11(e) and 11(f), to be described in detail later). The user rotates the contact portion 6C such that the protrusion 81B of the contact portion 6C engages with the recess 68A of the base portion 6B corresponding to the displayed marking.

The cartridge 4 in which the pen P is not housed in an accommodating portion 40 thereof is held with respect to the positioning jig 1B. The configuration of the cartridge 4 includes a known configuration disclosed by known technology. The pen P is inserted into the cartridge 4 from an upper end thereof in the downward direction. The writing portion Ps of the pen P protrudes downward from the lower end of the cartridge 4. The pen P is rotated in the rotational direction Y11 with respect to the cartridge 4 and the positioning jig 1B, such that a lengthwise direction of the leading end of the writing portion Ps of the pen P and an extending direction of the recess 81A of the contact portion 6C of the positioning jig 1B are aligned with each other. When the lengthwise direction of the leading end of the writing portion Ps and the extending direction of the recess 81A of the contact portion 6C are aligned with each other, the writing portion Ps is inserted into the recess 81A of the contact portion 6C, and the leading end of the writing portion Ps comes into contact with a bottom wall surface and an inner wall surface of the recess 81A. The pen P is positioned in the cartridge 4 in the up-down direction, and in the rotational direction Y11 centered on the rotational axis Ra.

A dial 42 of the cartridge 4 is operated, and the position of the pen P with respect to the cartridge 4 is fixed. The cartridge 4 is detached from the positioning jig 1B.

Main Processing

Main processing executed by the controller 71 of the cutting device 1A will be explained with reference to FIG. 9 to FIG. 11. When a power supply to the cutting device 1A is switched on, the main processing is started by the controller 71 reading out a program stored in the ROM 72 and executing the program.

The controller 71 displays, on the LCD 51, an input screen 51A (refer to FIG. 11(a)) for inputting the classification of the object. The controller 71 determines whether the classification of the object has been received as a result of a panel operation to select the classification (character/pattern classification/font classification/character classification) of the object (S11). FIG. 11(a) shows the input screen 51A in a state in which "character" has selected as the character/pattern classification, the italic font has been selected as the font classification, and the selection of the character classification is being received. When it is determined that the classification of the object has been received (yes at S11), the controller 71 selects and reads out, from the data tables 740 stored in the flash memory 74 (refer to FIG. 4 to FIG. 6), the data table 740 corresponding to the received classification of the object. The controller 71 acquires the drawing data stored for each of the line segments in the read out data table 740, and stores the acquired drawing data in the RAM 73 (S13). The controller 71 acquires the angle data stored for each of the line segments in the selected data table 740, and stores the acquired angle data in the RAM 73 (S15).

The controller 71 displays a preview screen 51B (refer to FIG. 11(b)) on the LCD 51. As shown in FIG. 11(b), on the preview screen 51B, a region is displayed that is defined by an image indicating the target object 20, and that is a region in which the drawing of the object is possible (hereinafter referred to as a "drawing region 511"). As shown in FIG. 9, the controller 71 generates, on the basis of the drawing data stored in the RAM 73, an image (hereinafter referred to as an "object image") representing the object of the classification received by the processing at S11. The controller 71 displays the generated object image in the drawing region 511 of the preview screen 51B (refer to FIG. 11(b)) (S17). When a panel operation is received to change the position of the object image displayed in the drawing region 511 of the preview screen 51B, the controller 71 changes the position of the object image in the drawing region 511 in accordance with the panel operation. The controller 71 advances the processing to S19.

On the other hand, when it is determined that the classification of the object has not been received (no at S11), the controller 71 advances the processing to S19.

The controller 71 determines whether a rotation command, which is a command to specify and rotate the object image displayed in the drawing region 511 (refer to FIG. 11(b)) of the preview screen 51B, has been received by a panel operation (S19). The rotation command includes a rotation amount (°) of the specified object image, and a rotational direction (clockwise or counterclockwise). When it is determined the rotation command has not been received (no at S19), the controller 71 advances the processing to S27.

The controller 71 determines whether a drawing command, which is a panel operation for starting the drawing of the object corresponding to the object image displayed in the drawing region 511 (refer to FIG. 11(b)) of the preview screen 51B, has been received (S27). When it is determined that a panel operation selecting an OK button in FIG. 11(b) has not been received, the controller 71 determines that the drawing command has not been received (no at S27). In this case, the controller 71 returns the processing to S11. The controller 71 displays, on the LCD 51, the input screen 51A (refer to FIG. 11(a)) for inputting the classification of the object. The controller 71 repeatedly determines whether the classification of the object by the panel operation to select the classification of the object has been received (S11).

For example, in the state in which the input screen 51A (refer to FIG. 11(a)) is displayed on the LCD 51, when classifications have been sequentially received for a plurality of objects "AB," "CD," and "EF," respectively (yes at S11), the controller 71 repeatedly acquires the drawing data and the angle data of each of the line segments from the data table 740 corresponding to each of the received classifications, and stores the acquired data in the RAM 73 (S13, S15). The controller 71 generates object images "AB," "CD," and "EF" representing the objects of the received classifications, and displays the object images in the drawing region 511 (refer to FIG. 11(b)) of the preview screen 51B (S17).

When it is determined that the rotation command, which is the command to specify and rotate the object image displayed in the drawing region 511 (refer to FIG. 11(b)) of the preview screen 51B, has been received (yes at S19), the controller 71 advances the processing to S21. Specifically, this is as follows. When an "edit button" has been selected on the preview screen 51B by a panel operation, the controller 71 displays "rotation buttons" for rotating the object image, as shown in FIG. 11(c). When the panel operation to specify the object to be rotated and to select the rotation buttons has been received, the controller 71 determines that the rotation command has been received (yes at S19). Of the angle data stored in the RAM 73 by the processing at S15, the controller 71 selects the angle data corresponding to the classification of the object corresponding to the object image specified as the object to be rotated. The controller 71 updates the fixed angle included in the selected angle data in accordance with the rotation amount and rotational direction included in the rotation command, and changes the angle data stored in the RAM 73 (S21).

More specifically, this is as follows. When Cr (°) is received as the rotation amount, for example, and the clockwise direction is received as the rotational direction, the controller 71 subtracts Cr from the fixed angle and updates the fixed angle, and changes the angle data. When Cs (°) is received as the rotation amount, for example, and the counterclockwise direction is received as the rotational direction, the controller 71 adds Cs to the fixed angle and updates the fixed angle, and changes the angle data (S21).

Of the drawing data stored in the RAM 73 by the processing at S15, the controller 71 selects the drawing data corresponding to the classification of the object corresponding to the object image specified as the object to be rotated. The controller 71 updates the start coordinate data and end coordinate data included in the selected drawing data, using coordinate transformation in accordance with the rotation amount and the rotational direction included in the rotation command, and changes the drawing data stored in the RAM 73 (S21).

On the basis of the updated drawing data, the controller 71 generates the object image after the rotation. The controller 71 displays the generated object image after the rotation in the drawing region 511 (refer to FIG. 11(c)) of the preview screen 51B, in place of the object image before the rotation. In this way, the controller 71 rotates the object image displayed on the preview screen 51B on the basis of the rotation command (S25). The controller 71 advances the processing to S27.

It is assumed, for example, that the object image "AB" displayed in the drawing region 511 on the preview screen 51B shown in FIG. 11(b) is specified, and the rotation command has been received to rotate the object image by 10° in the clockwise direction (yes at S19). In this case, for the fixed angle of the angle data (refer to FIG. 4), for each of the line segments L1 to L3 corresponding to the classification (character/italic/A) of the object "A," the controller 71 subtracts 10° from 45° and updates the angle data to 35° (S21). The controller 71 also updates the angle data for each of the line segments corresponding to the classification of the object "B" in the same manner. Further, the controller 71 updates the start coordinate data and the end coordinate data of the drawing data using coordinate transformation that rotates the coordinates by 10° in the clockwise direction (S21). The controller 71 generates the object image on the basis of the changed drawing data, and displays the updated object image in place of the object image "AB" before the rotation, in the drawing region 511 of the preview screen 51B. In this case, as in the preview screen 51B shown in FIG. 11(c), a state is obtained in which the object image "AB" has been rotated in the clockwise direction in accordance with the rotation amount (10°) and the rotational direction (the clockwise direction) included in the received rotation command.

Figure 9:
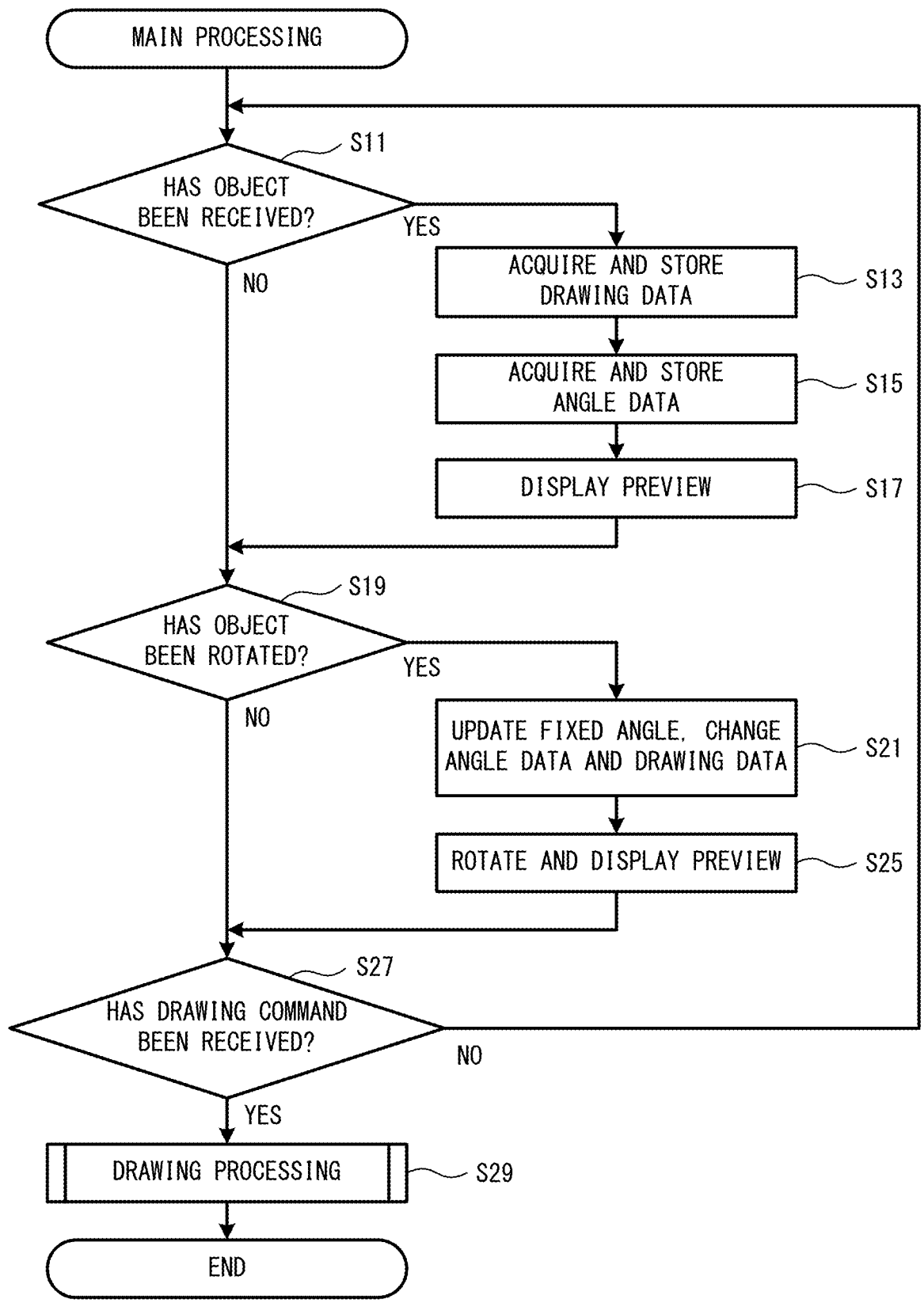
FIG. 9 is a flowchart of main processing.

As shown in FIG. 9, when the panel operation selecting the OK button of the preview screen 51B (refer to FIG. 11(b) and FIG. 11(c)) has been received, the controller 71 determines that the drawing command has been received (yes at S27). The controller 71 identifies, as the classification of the object to be drawn, the classification of the object corresponding to the object image displayed on the preview screen 51B. The controller 71 draws the object of the identified classification on the target object 20, by performing drawing processing (refer to FIG. 10) to be described below (S29).

Drawing Processing

The drawing processing will be explained with reference to FIG. 10. Of the drawing data and the angle data stored in the RAM 73, the controller 71 reads out and acquires the drawing data and the angle data corresponding to the selected classification, as the object to be drawn (S51). Hereinafter, a case will be explained as a specific example in which the object images "AB," "CD," and "EF" (refer to FIG. 11(b) and FIG. 11(c)) are selected. In this case, the controller 71 reads out and acquires, from the RAM 73, the drawing data and the angle data corresponding to each of the classification (character/italic/A) of the object "A," the classification (character/italic/B) of the object "B," the classification (character/Versal/C) of the object "C," the classification (character/Versal/D) of the object "D," the classification (character/Roman/E) of the object "E," and the classification (character/Roman/F) of the object "F" (S51). Here, it is assumed that the fixed angles included in the acquired angle data corresponding to each of the classifications of the objects "A" and "B" are the same for all of the line segments (45° (before rotation, (refer to FIG. 11(b))/35° (after rotation, (refer to FIG. 11(c)). It is assumed that the fixed angles included in the acquired angle data corresponding to each of the objects "C" and "D" are the same for all the line segments (90°). It is assumed that the fixed angles included in the acquired angle data corresponding to each of the objects "E" and "F" are the same for all of the line segments (60°).

The controller 71 selects one of the fixed angles from among the fixed angles included in the angle data acquired by the processing at S51, and reads out and acquires the angle data including the selected fixed angle and the drawing data corresponding to this angle data. Furthermore, the controller 71 selects another of the fixed angles that matches the selected fixed angle, and reads out and acquires the angle data including the other selected fixed angle and the drawing data corresponding to this angle data (S53). Specifically, when the drawing data and the angle data corresponding to the classifications of the objects "A," "B," "C," "D," "E," and "F" are acquired, first, the controller 71 acquires the drawing data and the angle data corresponding to the classifications of each of the objects "A" and "B" for which the fixed angle of the angle data is 45° (before rotation) or 35° (after rotation) for all of the line segments (S53). Hereinafter, the fixed angle of the angle data first acquired by the processing at S53 is referred to as a "first fixed angle."

Note that, in contrast to the above-described specific example, there is a case in which the fixed angles included in the angle data corresponding to the identified classification do not match for all of the line segments (the data table 74B, for example, (refer to FIG. 5)). In this case, only the angle data of the identified fixed angle, and the drawing data corresponding to this angle data are acquired by the processing at S53. Further, there is a case in which the angle data for which the fixed angle is common is associated with each of the plurality of classifications. In this case, by the processing at S53, the angle data including the identified fixed angle, and the drawing data corresponding to this angle data are acquired from the angle data and the drawing data associated with each of the plurality of classifications.

The controller 71 displays an angle notification screen 51E (refer to FIG. 11(e) and FIG. 11(f)) on the LCD 51 (S55). As shown in FIG. 11(e) and FIG. 11(f), a recommended marking, a recommended angle (a value in brackets), a guide image 514 schematically representing the base portion 6B and the contact portion 6C of the positioning jig 1B (refer to FIG. 7 and FIG. 8), and an OK button are included on the angle notification screen 51E. Numbers "1 to 12" corresponding to the markings [1] to [12] of the scale portion 660 of the base portion 6B, and an arrow 515 corresponding to the protrusion 81B of the contact portion 6C are included in the guide image 514. On the basis of the first fixed angle of the angle data acquired by the processing at S53, the controller 71 identifies the recommended angle and the recommended marking displayed on the angle notification screen 51E in the following manner.

When the first fixed angle of the angle data matches a value that is an integral multiple of 15, the controller 71 identifies the first fixed angle as the recommended angle without modification, and identifies the marking of the angle data as the recommended marking without modification. Specifically, for example, when the rotation command of the object image "AB" has not been received (no at S19, (refer to FIG. 11(b)), for all of the line segments of the respective classifications of the objects "A" and "B," the first fixed angle of the angle data is 45°, which matches a value of an integral multiple of 15. Thus, the controller 71 causes the first fixed angle of 45° of the angle data to be the recommended data without modification, causes the marking "4" of the angle data to be the recommended marking without modification, and displays the recommended angle and the recommended marking on the angle notification screen 51E, as shown in FIG. 11(e). Furthermore, in the guide image 514 of the angle notification screen 51E, the controller 71 displays the arrow 515 so as to be oriented toward the recommended marking "4" identified from among the numbers "1 to 12" (S55).

On the other hand, when the first fixed angle of the angle data is different from a value that is an integral multiple of 15, the controller 71 identifies, as the recommended angle, a value that is closest to the first fixed angle, among the values that are the integral multiples of 15. Further, the controller 71 identifies, as the recommended marking, a value obtained by adding 1 to a value obtained by dividing the recommended angle by 15. Specifically, when the rotation command has been received to rotate the object image "AB" by 10° in the clockwise direction (yes at S19, (refer to FIG. 11(c)), for example, for all of the line segments of the respective classifications of the objects "A" and "B," the first fixed angle of the angle data is updated to 35°, and is different to a value of an integral multiple of 15. Thus, of the values "15, 30, 45, 60, 75 . . . " that are the integral multiples of 15, the controller 71 identifies the value "30 (unit: °)" that is closest to the updated first fixed angle of 35°, as the recommended angle. Furthermore, the controller 71 identifies, as the recommended marking, the value "3" obtained by adding "1" to the value "2" obtained by dividing the recommended angle of 30° by 15. As shown in FIG. 11(f), the controller 71 displays the identified recommended angle of 30° and the recommended marking of "3" on the angle notification screen 51E. Furthermore, in the guide image 514 of the angle notification screen 51E, the controller 71 displays the arrow 515 so as to be oriented toward the recommended marking "3" identified from among the numbers "1 to 12" (S55).

When the angle notification screen 51E is displayed on the LCD 51, the user refers to the recommended marking, and performs the positioning of the pen P with respect to the cartridge 4 in the following manner, using the positioning jig 1B. The user rotates the contact portion 6C such that the protrusion 81B of the contact portion 6C engages with the recess 68A corresponding to the same marking as the recommended marking on the angle notification screen 51E, of the markings "1" to "12" of the scale portion 660 of the base portion 6B of the positioning jig 1B. The user holds the cartridge 4, with respect to the positioning jig 1B, in the state in which the pen P is not housed in the accommodating portion 40, and inserts the pen P from the upper end of the cartridge 4 in the downward direction. The user rotates the pen P in the rotational direction Y11 with respect to the cartridge 4 and the positioning jig 1B, and causes the lengthwise direction of the leading end of the writing portion Ps to be aligned with the extending direction of the recess 81A of the contact portion 6C. The leading end of the writing portion Ps is inserted into the recess 81A of the contact portion 6C. In this way, the position of the pen P is determined in the cartridge 4 in the rotational direction Y11. The dial 42 of the cartridge 4 is operated, and the position of the pen P is fixed with respect to the cartridge 4.

The user detaches the cartridge 4 from the positioning jig 1B. The user mounts the cartridge 4 in the mounting portion 32 of the head 5 of the cutting device 1A. In this way, the cutting device 1A is in a state of being able to draw the object "AB" corresponding to the drawing data acquired by the processing at S53, on the target object 20 using the pen P, on the basis of the corresponding classification (character/italic/A or B).

Figure 10:
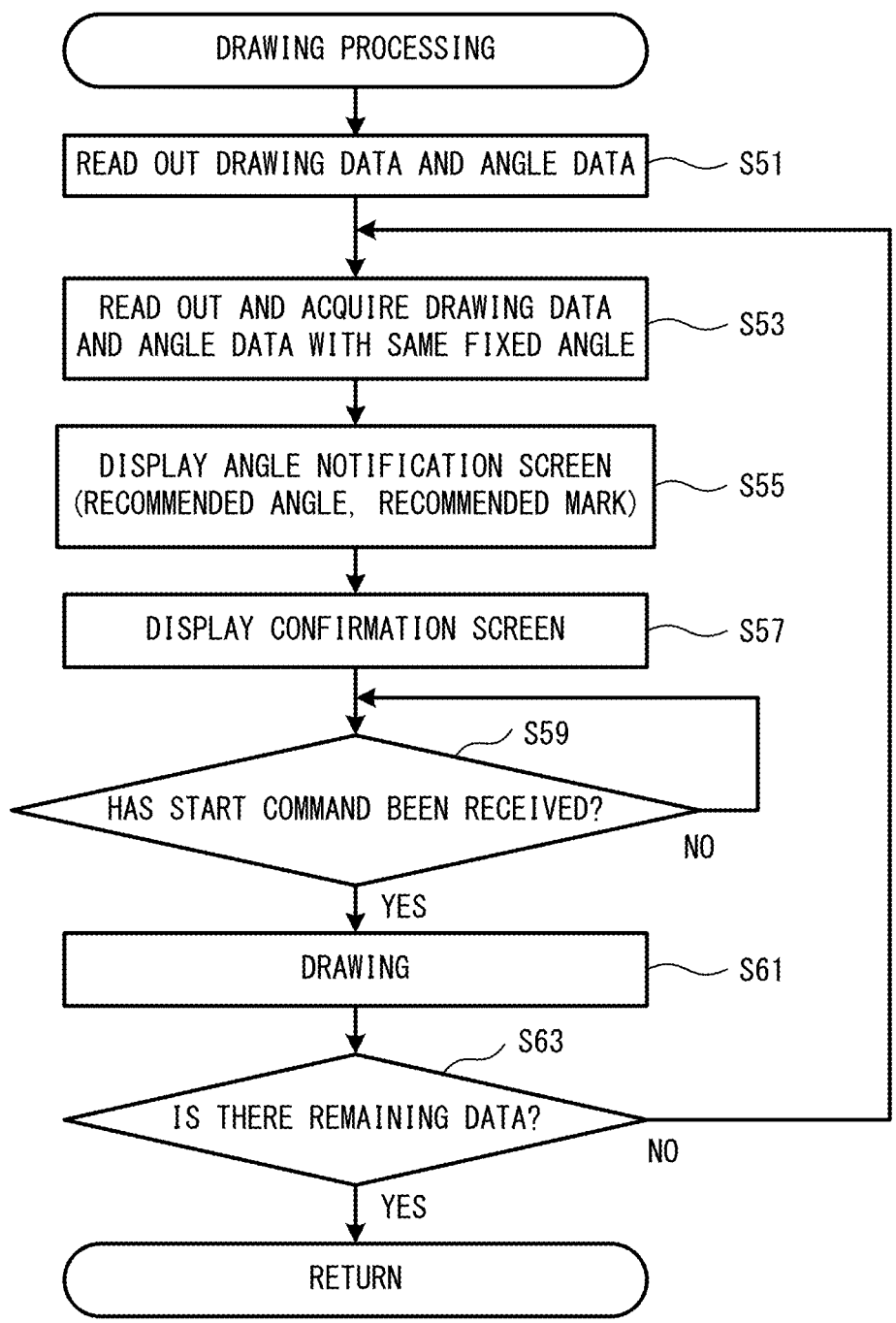
FIG. 10 is a flowchart of drawing processing.
Figure 11:
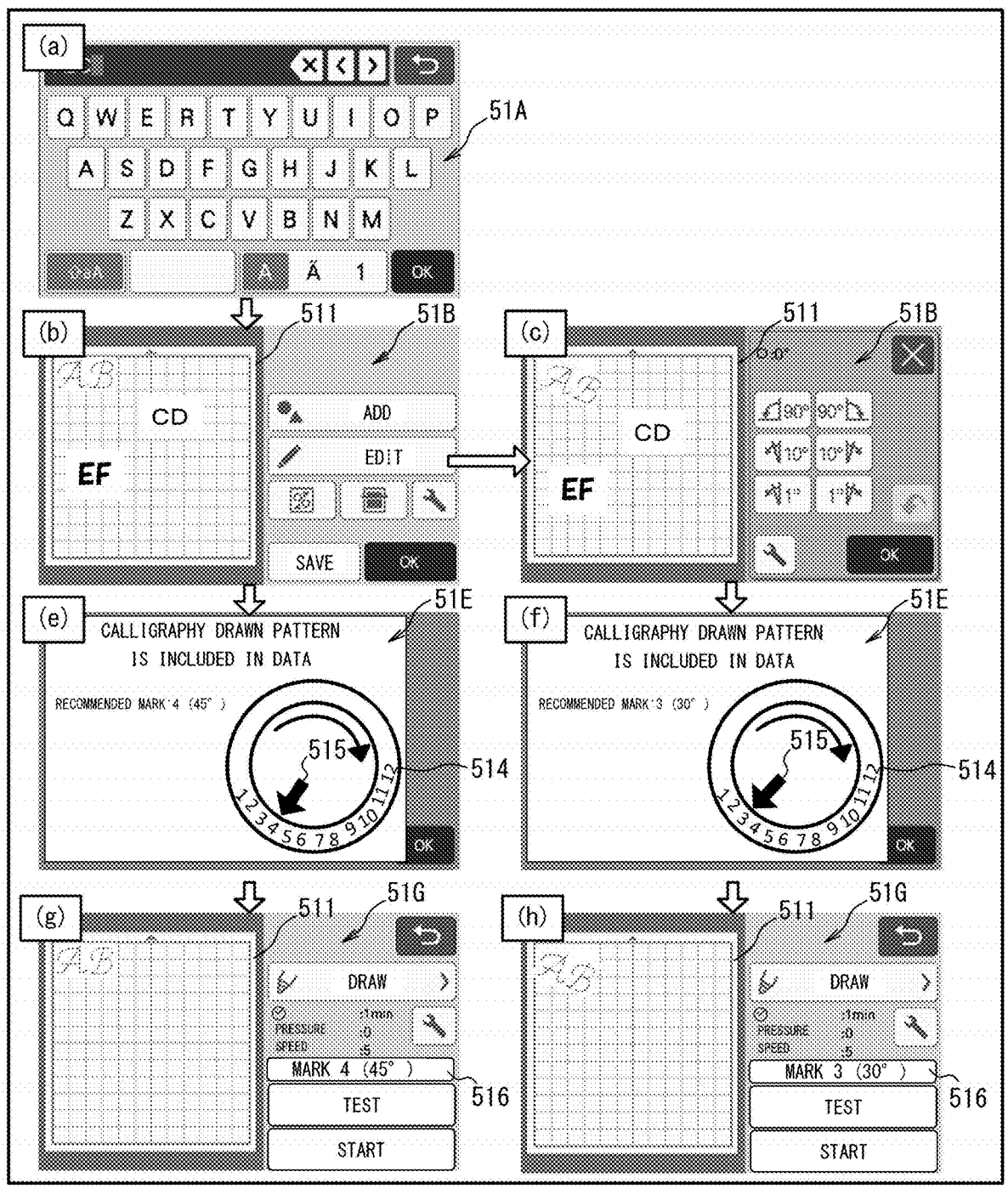
FIG. 11 is diagram showing screens displayed on an LCD 51 when executing the main processing.

As shown in FIG. 10, when a panel operation selecting the OK button has been received in the state in which the angle notification screen 51E (refer to FIG. 11(e) and FIG. 11(f)) is displayed by the processing at S55, the controller 71 advances the processing to S57. The controller 71 displays a confirmation screen 51G (refer to FIG. 11(g) and FIG. 11(h)) on the LCD 51 (S57). As shown in FIG. 11(g) and FIG. 11(h), the drawing region 511, a notification 516 of the recommended marking and the recommended angle (in brackets), and a start button for instructing the start of the drawing are included on the confirmation screen 51G. The object image representing the object of the classification corresponding to the drawing data and the angle data acquired by the processing at S53 is disposed in the drawing region 511.

For example, when the rotation command for the object image "AB" has not been received (no at S19, refer to FIG. 11(b)), the object image "AB" is displayed in the drawing region 511 in the state before rotation, as shown on the confirmation screen 51G in FIG. 11(g). Further, the notification 516 is displayed that shows the recommended marking "4" and the recommended angle "45°" displayed on the angle notification screen 51E (refer to FIG. 11(e)) by the processing at S55. On the other hand, when the rotation command for the object image "AB" has been received (yes at S19, refer to FIG. 11(c)), the object image "AB" that has been rotated by 10° in the clockwise direction is displayed in the drawing region 511, as shown on the confirmation screen 51G in FIG. 11(h). Further, the notification 516 is displayed that shows the recommended marking "3" and the recommended angle "30°" displayed on the angle notification screen 51E (refer to FIG. 11(f)) by the processing at S55.

As shown in FIG. 10, the controller 71 determines whether a panel operation selecting the start button on the confirmation screen 51G (refer to FIG. 11(g) and FIG. 11(h)) has been received (S59). When it is determined that the panel operation selecting the start button has not been received (no at S59), the controller 71 returns the processing to S59, and continues to monitor the panel operation. When it is determined that the panel operation selecting the start button has been received (yes at S59), the controller 71 advances the processing to S61. The controller 71 controls the conveyer 7 and the mover 8 on the basis of the drawing data acquired by the processing at S53. In this way, the controller 71 draws the plurality of line segments configuring the objects "A" and "B" of the classification (character/italic/A and B) on the target object 20 (S61).

Of the drawing data and the angle data acquired by the processing at S51, the controller 71 determines whether there is the drawing data and the angle data remaining that has not been acquired by the processing at S53 (S63). In the above-described case, the drawing data and the angle data corresponding to the classifications (character/Versal/C or D, character/Roman/E or F) of each of the objects "C," "D," "E," and "F" have not been selected by the processing at S53. Thus, of the drawing data acquired by the processing at S51, the controller 71 determines that there is the drawing data remaining that has not been acquired by the processing at S53 (no at S63). The controller 71 returns the processing to S53.

Of the fixed angles included in the angle data acquired by the processing at S51, the controller 71 selects one of the fixed angles that has not yet been selected, and reads out and acquires the angle data including the selected fixed angle and the drawing data corresponding to that angle data. Furthermore, the controller 71 selects another of the fixed angles that matches the selected fixed angle, and reads out and acquires the angle data including the selected other fixed angle and the drawing data corresponding to that angle data (S53). In this case, the controller 71 selects a second fixed angle that is different to the first fixed angle that has already been acquired, and acquires the angle data including the second fixed angle and the drawing data corresponding to that angle data, from among the angle data and the drawing data acquired by the processing at S51. For example, the controller 71 acquires the drawing data and the angle data corresponding to the classifications of the objects "C" and "D," respectively, for which the fixed angle of the angle data is 90° (the second fixed angle) for all of the line segments (S53).

The controller 71 identifies the recommended angle of 90° and the recommended marking "7" on the basis of the second fixed angle of the angle data acquired by the processing at S53, and displays the recommended angle and marking on the angle notification screen 51E (S55). The method for identifying the recommended angle and the recommended marking is the same as when performing the identification on the basis of the first fixed angle, and an explanation thereof is thus omitted.

The user refers to the angle notification screen 51E, and determines the position of the pen P with respect to the cartridge 4 using the positioning jig 1B. The user mounts the cartridge 4 on the mounting portion 32 of the head 5 of the cutting device 1A in a state in which the position of the pen P is determined to be 90° (the marking "7"). In this way, the cutting device 1A is in a state of being able to draw the object "CD" corresponding to the drawing data acquired by the processing at S53, on the target object 20 using the pen P, on the basis of the corresponding classification (character/Versal/C or D).

When the panel operation selecting the OK button has been received in the state in which the angle notification screen 51E is displayed by the processing at S55, the controller 71 displays the confirmation screen 51G on the LCD 51 (S57). Furthermore, when it is determined that the panel operation selecting the start button on the confirmation screen 51G has been received (yes at S59), the controller 71 controls the conveyer 7 and the mover 8 on the basis of the drawing data acquired by the processing at S53. In this way, the controller 71 draws the plurality of line segments configuring the objects "C" and "D" of the classification (character/Versal/C and D) on the target object 20 (S61).

Of the drawing data and the angle data acquired by the processing at S51, the controller 71 determines whether there is the drawing data and the angle data remaining that has not been acquired by the processing at S53 (S63). In the above-described case, the drawing data and the angle data corresponding to the classifications (character/Roman/E or F) of each of the objects "E" and "F" have not been selected by the processing at S53. Thus, of the drawing data acquired by the processing at S51, the controller 71 determines that there is the drawing data remaining that has not been acquired by the processing at S53 (no at S63). The controller 71 returns the processing to S53. By performing the processing from S53 to S61, the controller 71 draws the plurality of line segments configuring the objects "E" and "F" of the classification (character/Roman/E or F) on the target object 20.

When the controller 71 has drawn the objects "E" and "F" on the target object 20 (S61), of the drawing data and the angle data acquired by the processing at S51, the controller 71 determines that there is no drawing data and angle data remaining that has not been acquired by the processing at S53 (yes at S63). The controller 71 ends the drawing processing, and returns the processing to the main processing. As shown in FIG. 9, after ending the drawing processing (S29), the controller 71 ends the main processing.

Actions and Effects of Present Embodiment

In the cutting device 1A, before performing the operation of drawing the object on the target object 20, the recommended marking used to determine the position of the pen P in the cartridge 4 using the positioning jig 1B is displayed on the LCD 51 (refer to FIG. 11(e) and FIG. 11(f)). Thus, the user can refer to the displayed recommended marking, can fix the pen P to the cartridge 4 using the positioning jig 1B, and can mount the cartridge 4 on the mounting portion 32 of the cutting device 1A. In this case, the cutting device 1A can perform the drawing of the object in a state in which the pen P is fixed to the cartridge 4 at the fixed angle necessary for drawing the object of the classification selected by the user. Thus, the cutting device 1A can appropriately draw the object in calligraphy.

The data tables 740 are prepared for each of the classifications, and are stored in the flash memory 74. The classification includes the character/pattern classification, the font classification, and the character classification, and thus, the data tables 740 are also categorized by each of these classifications. When the character/pattern classification of the object is "character," the font is distinguished by the font classification, and the type of the character is distinguished by the character classification. In other words, when the object is the character, the drawing data and the angle data included in the data table 740 are defined for each of the font and the type of the character, and are stored in the flash memory 74. In this case, the cutting device 1A can perform the drawing of the object in a state in which the pen P has been adjusted to the appropriate fixed angle depending on the font and the type of the character. Thus, even when the fixed angle of the pen P differs for each of the font and the type of the character, the cutting device 1A can appropriately draw the character in calligraphy.

By displaying the recommended marking on the LCD 51, the cutting device 1A notifies the user of the fixed angle of the pen P that is necessary for drawing the object of the specified classification in calligraphy. When fixing the pen P to the cartridge 4 using the positioning jig 1B, the user rotates the contact portion 6C such that the convex port 81B of the contact portion 6C engages with the recess 81A, of the base portion 6B, corresponding to the notified recommended marking. By fixing the pen P to the cartridge 4 in this state, the user can fix the pen P to the cartridge 4 at the fixed angle necessary for drawing the object of the desired classification in calligraphy. Thus, the cutting device 1A can cause the user to easily perform the operation to fix the pen P to the cartridge 4 using the positioning jig 1B.

When the command to rotate the object has been instructed, it is necessary to change the fixed angle of the pen P with respect to the cartridge 4 in accordance with the rotation amount and the rotational direction of the command. Here, when the rotation command to rotate the object (the rotation amount and the rotational direction) have been acquired (yes at S19), the cutting device 1A updates the fixed angle of the angle data in accordance with the acquired rotation amount and rotational direction (S21). Furthermore, the cutting device 1A identifies the recommended angle and the recommended marking on the basis of the updated fixed angle, and displays the recommended angle and the recommended marking on the angle notification screen 51E (S55). In this case, the user can adjust the pen P to the fixed angle that is appropriate for drawing the rotated object. Thus, the cutting device 1A can appropriately draw the rotated object in calligraphy.

In the positioning of the pen P by the positioning jig 1B, the position can be set from 0° to 165° in 15° intervals. Here, when the fixed angle updated by the rotation command matches a value that is an integral multiple of 15, the cutting device 1A identifies the updated fixed angle as the recommended angle without modification and identifies the marking of the angle data as the recommended marking without modification, and displays the identified recommended angle and recommended marking on the LCD 51. On the other hand, when the fixed angle updated by the rotation command differs from a value that is an integral multiple of 15, the cutting device 1A identifies, as the recommended angle, a value that is closest to the updated fixed angle among the values that are the integral multiples of 15, identifies the recommended marking on the basis of the recommended angle, and displays the recommended angle and the recommended marking on the LCD 51 (S55). In this case, the recommended angle corresponding to a value that is an integral multiple of 15 and the recommended marking are always displayed on the LCD 51. In this case, the user can easily perform, using the positioning jig 1B, an operation to adjust the fixed angle of the pen P to be fixed to the cartridge 4 so as to be aligned with the recommended marking displayed on the LCD 51.

After the display of the angle notification screen 51E (refer to FIG. 11(e) and FIG. 11(f)), the cutting device 1A further causes the confirmation screen 51G (refer to FIG. 11(g) and FIG. 11(h)) to be displayed on the LCD 51. On the confirmation screen 51G, the object image representing the object to be drawn is displayed in the drawing region 511, and the recommended marking and the recommended angle are displayed. For example, when the rotation command has been received to rotate the object, the object image representing the format of the object after the rotation is displayed. In this case, the user can confirm a drawing format of the object after the rotation command, before the actual drawing is performed, along with the recommended angle and the recommended marking.

The cutting device 1A first reads out the angle data having the common fixed angle, which is the first fixed angle, and the drawing data corresponding to that angle data (S53), and draws the corresponding object on the target object 20 (S61). After the drawing, the cutting device 1A next reads out the angle data having the common second fixed angle other than the first fixed angle, and the drawing data corresponding to that angle data (S53), and draws the corresponding object on the target object 20 (S61). In this case, of the respective plurality of objects, the objects having the common fixed angle are drawn as a batch. Note that the angle data and the drawing data are defined for each of the line segments configuring the object. As a result, the cutting device 1A can draw the line segments having the common fixed angle as a batch, and thus, a number of times to change the fixed angle of the pen P with respect to the cartridge 4 can be suppressed to a minimum. Thus, at the same time as reducing the time and effort for determining the position of the pen P with respect to the cartridge 4 using the positioning jig 1B, the cutting device 1A can shorten a time period required to complete the drawing of all of the objects.

In the above-described embodiment, in the angle data corresponding to the respective classifications of the objects "A" to "F," all of the line segments for each of the classifications are the same. Thus, in the drawing processing (refer to FIG. 10), the cutting device 1A selects the angle data and the drawing data in the processing at S53 in units of the classification, and draws the object on the basis of the corresponding drawing data. In this case, the cutting device 1A can draw a plurality of line segments included in the object in one batch for each of the objects, and thus, displacement of the line segments configuring the object can be suppressed to a minimum. Thus, the cutting device 1A can cause each of the objects to be drawn to have a favorable appearance.

Modified Examples

The present disclosure is not limited to the above-described embodiment and various modifications are possible. The cutting device 1A may be a dedicated device (a drawing device, for example) for realizing the function of drawing the object on the target object 20 using the pen P. The cutting device 1A need not necessarily be provided with the mounting portion 32, and the cartridge 4 may be directly fixed to the head 5. In this case, the user may directly fix the pen P to the cartridge 4 of the cutting device 1A.

The fixed angle only may be included in the angle data of the data table 740, and the marking need not necessarily be included. The fixed angle of the data table 740 may be a desired value, and need not necessarily be a value of an integral multiple of 15. The controller 71 may calculate the marking, as necessary, by dividing the fixed angle of the angle data by 15.

The marking only may be included in the angle data of the data table 740, and the fixed angle need not necessarily be included. The information notified by the angle notification screen 51E may be the recommended marking only.

The cutting device 1A may perform notification of the recommended angle only on the angle notification screen 51E. The user may perform the adjustment, without using the positioning jig 1B, such that the pen P is fixed to the cartridge 4 at the notified recommended angle.

In the data table 740, the data stored for each of the line segments may be the drawing data only, and the angle data need not necessarily be stored. In this case, another table may be provided in the flash memory 74 in which the angle data is associated with each of the font classifications. The controller 71 may identify the angle data corresponding to the font classification of the data table 740 by referring to the other table.

A method for identifying the recommended angle and the recommended marking on the basis of the fixed angle is not limited to that of the above-described embodiment. Depending on a number and an arrangement of the recesses 68A corresponding to each of the markings of the scale portion 660 of the positioning jig 1B, a cardinal number (a value corresponding to 15 in the above-described embodiment) when the recommended angle and the recommended marking are calculated from the fixed angle may be changed. When the rotation angle updated by the rotation command is the value that differs from a value of an integral multiple of 15, the cutting device 1A may display, on the LCD 51, the updated fixed angle without modification as the recommended angle, and may display, on the LCD 51, a value obtained by dividing the fixed angle by 15, that is, a value including a value after a decimal point, without modification as the recommended marking. The guide image 514 schematically showing a part of the positioning jig 1B need not necessarily be included on the angle notification screen 51E.

When the user determines the position of the pen P with respect to the cartridge 4, the positioning jig 1B need not necessarily be used. For example, markings "1" to "12" may be provided in advance in the side wall of the cartridge 4. The user may determine the position of the pen P with respect to the cartridge 4 by visually adjusting a positional relationship between the provided markings and the end in the lengthwise direction of the writing portion Ps of the pen P. Further, after mounting the cartridge 4 on the mounting portion 32 of the cutting device 1A, the user may rotate the pen P while visually checking, and may fix the pen P to the cartridge 4 such that the pen P is at the rotation angle matching the recommended angle.

In the above-described embodiment, the fixed angle of the angle data corresponding to each of the plurality of line segments included in the objects of each of the classifications is common to each of the classifications. In contrast to this, the fixed angle of the angle data corresponding to each of the plurality of line segments included in the objects of each of the classifications may be different for each of the line segments (such as the data table 74B (refer to FIG. 5), for example). In this case, when performing the drawing processing (refer to FIG. 10), during a period until the drawing of the object of the one classification ends, the processing from S53 to S61 may be performed a plurality of times. In this case, until the drawing of the object of the one classification is complete, the fixed angle of the pen P with respect to the cartridge 4 may be changed a plurality of times. Further, when drawing the object of a plurality of classifications, of the plurality of line segments included in each of the plurality of objects, the line segments having the common fixed angle may be drawn in a batch by performing the processing from S53 to S61 once. In other words, a sequence in which each of the plurality of line segments included in each of the plurality of objects is drawn may be switched in accordance with the corresponding fixed angles.

In the above-described embodiment, the controller 71 first reads out the angle data and the drawing data in which the fixed angle is the common first fixed angle (S53), and draws the corresponding object on the target object 20 (S61). After the drawing, the cutting device 1A next reads out the angle data and the drawing data in which the fixed angle is the common second fixed angle that is different from the first fixed angle (S53), and draws the corresponding object on the target object 20 (S61). In contrast to this, the controller 71 may sequentially select, one by one, the line segments configuring each of the plurality of objects, regardless of whether the fixed angle included in the angle data is the same or different, and may acquire the drawing data and the angle data corresponding to the selected line segment (S53). The controller 71 may identify the recommended angle and the recommended marking on the basis of the fixed angle of the acquired angle data, and may display the recommended angle and the recommended marking on the angle notification screen (S55). The controller 71 may draw the line segment on the target object 20 on the basis of acquired drawing data (S61). The above processing (S53 to S61) may be repeated until all of the line segments included in each of the plurality of objects have been selected. In this case, even when drawing the object including the plurality of line segments for which the fixed angles of the pen P differ, the plurality of line segments are drawn as a batch for each of the objects. Thus, the cutting device 1A can suppress displacement of the plurality of line segments configuring the object to a minimum, and the favorable appearance of each of the objects to be drawn can be achieved.

What is claimed is:

1. A drawing device that draws on a target object using a pen fixed to a cartridge, the drawing device comprising:
   a mover configured to move the cartridge in a first direction;
   a conveyer configured to convey the target object in a second direction orthogonal to the first direction;
   a processor configured to control the mover and the conveyer to cause the cartridge and the target object to move relative to each other, and to draw an object on the target object using the pen; and
   a memory configured to store, for each classification of each of a plurality of the objects, drawing data representing control conditions of the mover and the conveyer for drawing the object, and angle data representing a fixed angle of the pen with respect to the cartridge when drawing the object, the fixed angle being an angle in a rotation direction with a direction in which an axis line of the pen fixed to the cartridge extends as a rotation axis, and the memory being configured to store computer-readable instructions that, when executed by the processor, instruct the processor to perform processes comprising:

receiving at least one of the classifications of the plurality of objects;

reading out and acquiring, from the memory, the drawing data and the angle data corresponding to the received at least one classification;

displaying, on a display, fixed angle information corresponding to the fixed angle represented by the acquired angle data;

controlling the mover and the conveyer on the basis of the acquired drawing data; and drawing the object of the received classification on the target object.

2. The drawing device according to claim 1, wherein the plurality of objects include a character, the classifications are categorized for each of fonts of the character, and the memory stores the angle data for each of the classifications.

3. The drawing device according to claim 1, wherein the computer-readable instructions further instruct the processor to perform processes comprising:

acquiring a rotation command to rotate the object of the received classification; and updating the fixed angle represented by the acquired angle data, in accordance with a rotation amount of the object to be rotated on the basis of the acquired rotation command, and displaying, on the display, the fixed angle information corresponding to the updated fixed angle.

4. The drawing device according to claim 3, wherein when the updated fixed angle matches a value of an integral multiple of a predetermined value, the processor displays, on the display, the fixed angle information corresponding to the updated fixed angle, and when the updated fixed angle differs from a value of an integral multiple of the predetermined value, the processor displays, on the display, the fixed angle information corresponding to a value closest to the updated fixed angle, of values of integral multiples of the predetermined value.

5. The drawing device according to claim 1, wherein the computer-readable instructions further instruct the processor to perform processes comprising:

receiving the classifications of each of the plurality of objects;

acquiring, from the memory, first drawing data and first angle data corresponding to a first classification that is one of the received plurality of classifications;

displaying, on the display, the fixed angle information corresponding to a first fixed angle represented by the acquired first angle data;

controlling the mover and the conveyer on the basis of the acquired first drawing data;

drawing a first object of the received first classification on the target object;

acquiring, from the memory, second drawing data and second angle data corresponding to a second classification that is one of the received plurality of classifications other than the first classification;

after drawing the first object on the target object, displaying, on the display, the fixed angle information corresponding to a second fixed angle represented by the acquired second angle data; and after displaying, on the display, the fixed angle information corresponding to the second fixed angle, controlling the mover and the conveyer on the basis of the acquired second drawing data, and drawing a second object of the received second classification on the target object.

6. The drawing device according to claim 1, wherein the computer-readable instructions further instruct the processor to perform processes comprising:

receiving the classifications of each of the plurality of objects;

acquiring, from the memory, a plurality of the drawing data and a plurality of the angle data corresponding to the plurality of received classifications;

displaying, on the display, the fixed angle information corresponding to a specific first fixed angle, of a plurality of fixed angles represented by the acquired plurality of angle data;

controlling the mover and the conveyer on the basis of first drawing data corresponding to first angle data representing the first fixed angle, of the acquired plurality of drawing data;

drawing, on the target object, a segment corresponding to the first drawing data, of each of the plurality of objects of the received plurality of classifications;

after drawing the segment corresponding to the first drawing data on the target object, displaying, on the display, the fixed angle information corresponding to a second fixed angle, of the plurality of fixed angles represented by the acquired plurality of angle data, that is an angle other than the first fixed angle;

after displaying, on the display, the fixed angle information corresponding to the second fixed angle, controlling the mover and the conveyer on the basis of second drawing data corresponding to second angle data representing the second fixed angle, of the acquired plurality of drawing data; and drawing, on the target object, a segment corresponding to the second drawing data, of each of the plurality of objects of the received plurality of classifications.

7. The drawing device according to claim 1, wherein the object includes a plurality of line segments, the memory stores, for each of the plurality of line segments, line segment drawing data representing control conditions of the mover and the conveyer for drawing each of the plurality of line segments, and line segment angle data representing the fixed angle of the pen with respect to the cartridge when drawing the line segment, and the computer-readable instructions further instruct the processor to perform processes comprising:

acquiring, from the memory, first line segment drawing data and first line segment angle data corresponding to a first line segment that is one of the plurality of line segments included in the object of the received classification;

displaying, on the display, the fixed angle information corresponding to a third fixed angle represented by the acquired first line segment angle data;

controlling the mover and the conveyer on the basis of the acquired first line segment drawing data;

drawing the first line segment on the target object;

acquiring, from the memory, second line segment drawing data and second line segment angle data corresponding to a second line segment, of the plurality of line segments included in the object of the received classification, that is a line segment other than the first line segment;

after drawing the first line segment on the target object, displaying, on the display, the fixed angle information corresponding to a fourth fixed angle represented by the acquired second line segment angle data;

after displaying, on the display, the fixed angle information corresponding to the fourth fixed angle, controlling the mover and the conveyer on the basis of the acquired second line segment drawing data; and drawing the second line segment on the target object.

8. The drawing device according to claim 1, wherein
the object includes a plurality of line segments,
the memory stores, for each of the plurality of line segments, line segment drawing data representing control conditions of the mover and the conveyer for drawing each of the plurality of line segments, and line segment angle data representing the fixed angle of the pen with respect to the cartridge when drawing the line segment, and
the computer-readable instructions further instruct the processor to perform processes comprising:

acquiring, from the memory, first line segment angle data representing a specific third fixed angle, of the plurality of line segment angle data corresponding to the plurality of line segments included in the object of the received classification, and first line segment drawing data corresponding to the first line segment angle data;

displaying, on the display, the fixed angle information corresponding to the third fixed angle;

controlling the mover and the conveyer on the basis of the acquired first line segment drawing data;

drawing, on the target object, a line segment corresponding to the first line segment drawing data, of the plurality of line segments;

acquiring, from the memory, second line segment angle data representing a fourth fixed angle, of the plurality of line segment angle data corresponding to the plurality of line segments included in the object of the received classification, that is a fixed angle other than the third fixed angle, and second line segment drawing data corresponding to the second line segment angle data;

after drawing, on the target object, the line segment corresponding to the first line segment drawing data, displaying, on the display, the fixed angle information corresponding to the fourth fixed angle; and after displaying, on the display, the fixed angle information corresponding to the fourth fixed angle, controlling the mover and the conveyer on the basis of the acquired second line segment drawing data; and drawing, on the target object, a line segment corresponding to the second line segment drawing data, of the plurality of line segments.

9. The drawing device according to claim 1, wherein
the computer-readable instructions further instruct the processor to perform a process comprising:

displaying, on the display, a parameter provided on a jig used for fixing the pen to the cartridge, the parameter corresponding to the fixed angle information, and when fixing the pen to the cartridge, the jig is configured to fix the pen to the cartridge at the desired fixed angle, by referring to the parameter corresponding to the fixed angle information.

10. The drawing device according to claim 3, wherein
the computer-readable instructions further instruct the processor to perform processes comprising:

further displaying, on the display, the object corresponding to the received at least one classification; and when the rotation command is acquired, displaying the object rotated on the basis of the acquired rotation command on the display, along with the fixed angle information corresponding to the updated fixed angle.

11. A drawing method for drawing an object on a target object, using a drawing device including a mover that moves a cartridge, to which a pen is fixed, in a first direction, a conveyer that conveys the target object in a second direction orthogonal to the first direction, and a processor that controls the mover and the conveyer to cause the cartridge and the target object to move relative to each other, and to draw the object on the target object using the pen fixed to the cartridge, the method comprising:

receiving at least one classification of a plurality of the objects;

reading out and acquiring drawing data and angle data corresponding to the received at least one classification, from a memory configured to store, for each of the classifications of each of the plurality of objects, the drawing data representing control conditions of the mover and the conveyer for drawing the object, and the angle data representing a fixed angle of the pen with respect to the cartridge when drawing the object, the fixed angle being an angle in a rotation direction with a direction in which an axis line of the pen fixed to the cartridge extends as a rotation axis;

displaying, on a display, fixed angle information corresponding to the fixed angle represented by the acquired angle data;

controlling the mover and the conveyer on the basis of the acquired drawing data; and drawing the object of the received classification on the target object.

* * * * *